(12) United States Patent
Crouzet

(10) Patent No.: US 9,987,785 B2
(45) Date of Patent: Jun. 5, 2018

(54) APPLYING FLOWABLE MATERIALS TO SYNTHETIC SUBSTRATES

(71) Applicant: Zephyros, Inc., Romeo, MI (US)

(72) Inventor: Francois Crouzet, Lingolsheim (FR)

(73) Assignee: Zephyros, Inc., Romeo, MI (US)

( * ) Notice: Subject to any disclaimer, the term of this patent is extended or adjusted under 35 U.S.C. 154(b) by 135 days.

(21) Appl. No.: 14/396,768

(22) PCT Filed: Apr. 26, 2013

(86) PCT No.: PCT/IB2013/053311
§ 371 (c)(1),
(2) Date: Oct. 24, 2014

(87) PCT Pub. No.: WO2013/160878
PCT Pub. Date: Oct. 31, 2013

(65) Prior Publication Data
US 2015/0147472 A1 May 28, 2015

(30) Foreign Application Priority Data

Apr. 26, 2012 (GB) .................................. 1207481.1

(51) Int. Cl.
*B29C 47/06* (2006.01)
*B05D 1/28* (2006.01)
*B05D 3/02* (2006.01)

(52) U.S. Cl.
CPC ................. *B29C 47/06* (2013.01); *B05D 1/28* (2013.01); *B05D 3/0254* (2013.01)

(58) Field of Classification Search
None
See application file for complete search history.

(56) References Cited

U.S. PATENT DOCUMENTS 3,880,948 A * 4/1975 Chompff ................. C08L 63/00
525/119
4,083,384 A 4/1978 Horne et al.
(Continued)

FOREIGN PATENT DOCUMENTS

CN      1342182 A     3/2002
DE      1704824       4/1967
(Continued)

OTHER PUBLICATIONS

European Communication dated May 12, 2013, Application No. 13726879.3.
(Continued)

*Primary Examiner* — Shamim Ahmed
*Assistant Examiner* — Bradford M Gates
(74) *Attorney, Agent, or Firm* — The Dobrusin Law Firm, PC

(57) ABSTRACT

Methods and apparatuses are disclosed for applying activatable melt flowable materials to substrates made from synthetic materials. The methods are concerned with formation of appropriate flowable materials, control over the manner in which the flowable materials are applied, treatment of the substrates prior to application of the flowable materials and the selection of the optimum combination of materials for the substrates and the flowable materials. The methods may be particularly suited for applying flowable materials to surfaces to produce components found in automotive, aerospace including trucks, busses and tractors and marine vehicles.

19 Claims, 1 Drawing Sheet

(56) References Cited

U.S. PATENT DOCUMENTS

| | | |
|---|---|---|
| 4,178,337 A | 12/1979 | Hall et al. |
| 4,399,174 A | 8/1983 | Tanaka et al. |
| 4,437,046 A | 3/1984 | Faillace |
| 4,448,736 A | 5/1984 | Emery et al. |
| 4,610,836 A | 9/1986 | Wycech |
| 4,813,690 A | 3/1989 | Coburn, Jr. |
| 4,853,270 A | 8/1989 | Wycech |
| 4,868,968 A | 9/1989 | Dixon et al. |
| 4,922,596 A | 5/1990 | Wycech |
| 4,923,902 A | 5/1990 | Wycech |
| 4,978,562 A | 12/1990 | Wycech |
| 5,085,021 A | 2/1992 | Kuhnert |
| 5,124,186 A | 6/1992 | Wycech |
| 5,266,133 A | 11/1993 | Hanley et al. |
| 5,336,349 A | 8/1994 | Cornils et al. |
| 5,358,397 A | 10/1994 | Ligon et al. |
| 5,382,397 A | 1/1995 | Turner, Jr. |
| 5,507,994 A | 4/1996 | Cornils et al. |
| 5,544,930 A | 8/1996 | Stedman |
| 5,554,325 A | 9/1996 | Kotte et al. |
| 5,693,174 A | 12/1997 | Fukuda et al. |
| 5,712,318 A | 1/1998 | Makhlouf et al. |
| 5,755,486 A | 5/1998 | Wycech |
| 5,766,719 A | 6/1998 | Rimkus |
| 5,805,021 A | 9/1998 | Brehmer |
| 5,810,956 A | 9/1998 | Tanis et al. |
| 5,846,465 A | 12/1998 | Koganezawa et al. |
| 5,878,784 A | 3/1999 | Sales et al. |
| 5,932,680 A | 8/1999 | Heider |
| 6,021,753 A | 2/2000 | Chaffin et al. |
| 6,030,701 A | 2/2000 | Johnson et al. |
| 6,053,210 A | 4/2000 | Chapman et al. |
| 6,093,358 A | 7/2000 | Schiewe et al. |
| 6,103,341 A | 8/2000 | Barz et al. |
| 6,131,897 A | 10/2000 | Barz et al. |
| 6,135,541 A | 10/2000 | Geise et al. |
| 6,253,819 B1 | 7/2001 | Frendle et al. |
| 6,254,488 B1 | 7/2001 | Hill |
| 6,270,600 B1 | 8/2001 | Wycech |
| 6,305,136 B1 | 10/2001 | Hopton |
| 6,311,452 B1 | 11/2001 | Barz et al. |
| 6,321,793 B1 | 11/2001 | Czaphcki et al. |
| 6,328,919 B1 | 12/2001 | Pham et al. |
| 6,383,610 B1 | 5/2002 | Barz et al. |
| 6,389,775 B1 | 5/2002 | Steiner et al. |
| 6,406,078 B1 | 6/2002 | Wycech |
| 6,419,305 B1 | 7/2002 | Larsen |
| 6,431,635 B2 * | 8/2002 | Nicastri ............ 296/107.09 |
| 6,444,713 B1 | 9/2002 | Pachl et al. |
| 6,467,834 B1 | 10/2002 | Barz et al. |
| 6,471,285 B1 | 10/2002 | Czaplicki et al. |
| 6,482,486 B1 | 11/2002 | Czaplicki et al. |
| 6,533,866 B1 | 3/2003 | Franz et al. |
| 6,550,847 B2 | 4/2003 | Honda et al. |
| 6,561,571 B1 | 5/2003 | Brennecke |
| 6,573,309 B1 | 6/2003 | Reitenbach et al. |
| 6,607,831 B2 | 8/2003 | Ho et al. |
| 6,620,501 B1 | 9/2003 | Bradley |
| 6,634,698 B2 | 10/2003 | Kleino |
| 6,668,457 B1 | 12/2003 | Czaplicki |
| 6,682,818 B2 | 1/2004 | Czaplicki |
| 6,752,451 B2 | 6/2004 | Sakamoto |
| 6,753,379 B1 | 6/2004 | Kawate et al. |
| 6,811,864 B2 | 11/2004 | Czaplicki et al. |
| 6,820,923 B1 | 11/2004 | Bock |
| 6,846,559 B2 | 1/2005 | Czaplicki et al. |
| 6,926,784 B2 | 8/2005 | Bock |
| 7,004,536 B2 | 2/2006 | Wieber |
| 7,041,193 B2 | 5/2006 | Bogert et al. |
| 7,043,815 B2 | 5/2006 | Lande et al. |
| 7,077,460 B2 | 7/2006 | Czaplicki et al. |
| 7,180,027 B2 | 2/2007 | Hable et al. |
| 7,186,027 B2 | 2/2007 | Hable et al. |
| 7,249,415 B2 | 7/2007 | Larsen et al. |
| 7,290,828 B2 | 11/2007 | Kosal et al. |
| 7,673,930 B2 | 3/2010 | Stratman |
| 7,748,773 B2 | 7/2010 | Niezur et al. |
| 7,892,396 B2 | 2/2011 | Sheasley |
| 2001/0042353 A1 | 11/2001 | Honda et al. |
| 2002/0066254 A1 | 6/2002 | Ebbinghaus |
| 2002/0088908 A1 | 7/2002 | Broccardo et al. |
| 2002/0164450 A1 | 11/2002 | Lupini et al. |
| 2003/0140671 A1 | 7/2003 | Lande et al. |
| 2003/0184121 A1 | 10/2003 | Czaplicki et al. |
| 2003/0201572 A1 | 10/2003 | Coon et al. |
| 2003/0209921 A1 | 11/2003 | Coon et al. |
| 2004/0011282 A1 | 1/2004 | Myers et al. |
| 2004/0018353 A1 | 1/2004 | Czaplicki et al. |
| 2004/0034982 A1 | 2/2004 | Deachin |
| 2004/0046423 A1 | 3/2004 | Wieber |
| 2004/0056472 A1 | 3/2004 | Schneider |
| 2004/0076831 A1 | 4/2004 | Kassa |
| 2004/0135058 A1 | 7/2004 | Wycech |
| 2004/0180206 A1 | 9/2004 | Czaplicki et al. |
| 2004/0195817 A1 | 10/2004 | Tarbutton et al. |
| 2004/0262810 A1 | 12/2004 | Barz et al. |
| 2004/0262853 A1 | 12/2004 | Larsen et al. |
| 2005/0020703 A1 | 1/2005 | Czaplicki et al. |
| 2005/0217785 A1 | 10/2005 | Hable et al. |
| 2005/0268454 A1 | 12/2005 | White |
| 2005/0285292 A1 | 12/2005 | Mendiboure et al. |
| 2006/0008615 A1 | 1/2006 | Muteau et al. |
| 2006/0045866 A1 | 3/2006 | Chappelow et al. |
| 2006/0057333 A1 | 3/2006 | Brahim |
| 2006/0127584 A1 | 6/2006 | Lande et al. |
| 2006/0144513 A1 | 7/2006 | Bogert et al. |
| 2006/0188693 A1 | 8/2006 | Brozenick et al. |
| 2008/0023987 A1 | 1/2008 | Schneider et al. |
| 2008/0029214 A1 | 2/2008 | Hable et al. |
| 2008/0060742 A1 | 3/2008 | Sheasley et al. |
| 2009/0108626 A1 | 4/2009 | Richardson et al. |
| 2010/0130629 A1* | 5/2010 | Kometani ............ A43B 13/04 521/128 |
| 2011/0236616 A1 | 9/2011 | Belpaire |
| 2014/0023786 A1 | 1/2014 | Hoff et al. |

FOREIGN PATENT DOCUMENTS

| Country | Number | Date |
|---|---|---|
| DE | 29904705 U1 | 7/1999 |
| DE | 10224707 A1 | 4/2002 |
| DE | 10052108 A1 | 5/2002 |
| EP | 0112290 A2 | 5/1983 |
| EP | 0588182 A2 | 3/1994 |
| EP | 0748683 A2 | 6/1996 |
| EP | 0748685 A | 12/1996 |
| EP | 0755768 A | 1/1997 |
| EP | 0775721 A1 | 5/1997 |
| EP | 1182087 A2 | 2/2002 |
| EP | 1331080 A2 | 7/2003 |
| EP | 1428744 | 6/2004 |
| EP | 1134314 B1 | 9/2004 |
| EP | 1471105 A2 | 10/2004 |
| EP | 1582268 A1 | 5/2005 |
| EP | 1582268 A1 | 10/2005 |
| EP | 1932648 A | 6/2008 |
| EP | 2147848 A1 | 1/2010 |
| EP | 2427362 | 3/2012 |
| FR | 1518739 | 12/1975 |
| GB | 1518739 A | 7/1978 |
| GB | 2105064 A | 3/1983 |
| GB | 2302360 A | 1/1997 |
| WO | 89/06595 | 7/1989 |
| WO | 99/36243 | 7/1999 |
| WO | 99/48746 | 9/1999 |
| WO | 00/10802 | 3/2000 |
| WO | 00/27920 | 5/2000 |
| WO | 00/38863 | 7/2000 |
| WO | 00/46461 | 8/2000 |
| WO | 02/055923 A2 | 7/2002 |
| WO | 2003/000535 | 1/2003 |
| WO | 04/067304 | 8/2004 |
| WO | 04/078451 | 9/2004 |
| WO | 2005/002950 A2 | 1/2005 |
| WO | 05/080524 | 9/2005 |

(56) References Cited

FOREIGN PATENT DOCUMENTS

| WO | 05/105441     | 11/2005 |
|----|---------------|---------|
| WO | 2009/091953 A2| 7/2009  |
| WO | 2011/146793 A1| 11/2011 |
| WO | 2012/104071 A2| 8/2012  |
| WO | 2012/110230 A1| 8/2012  |

OTHER PUBLICATIONS

PCT International Search Report & Written Opinion dated Nov. 29, 2013; Application No. PCT/IB2013/053311.
PCT International Preliminary Report on Patentability dated Apr. 25, 2014; Application No. PCT/IB2013/053311.
Mansour et al., Optimal Bonding Thickness for Vehicle Stiffness (2001).
European Search Report dated Aug. 31, 2004, Application No. EP03075228.
International Preliminary Report on Patentability dated Jul. 11, 2012; application No. PCT/2011/037271.
Chinese Office Action dated Jul. 28, 2014; Application No. 2011800305358.
International Search Report and Written Opinion dated Jul. 28, 2011 for related PCT Application No. US2011/037271 filed May 20, 2011; Published as WO 2011/1467930 on Nov. 24, 2011.
European Examination Report dated Sep. 15, 2016, for related co-pending European Application No. 13726879.3.
European examination report for European Application No. 13726879.3 dated Jul. 20, 2017.
Notice of Opposition as filed Jul. 14, 2017, Application No. 12704671.2.

* cited by examiner

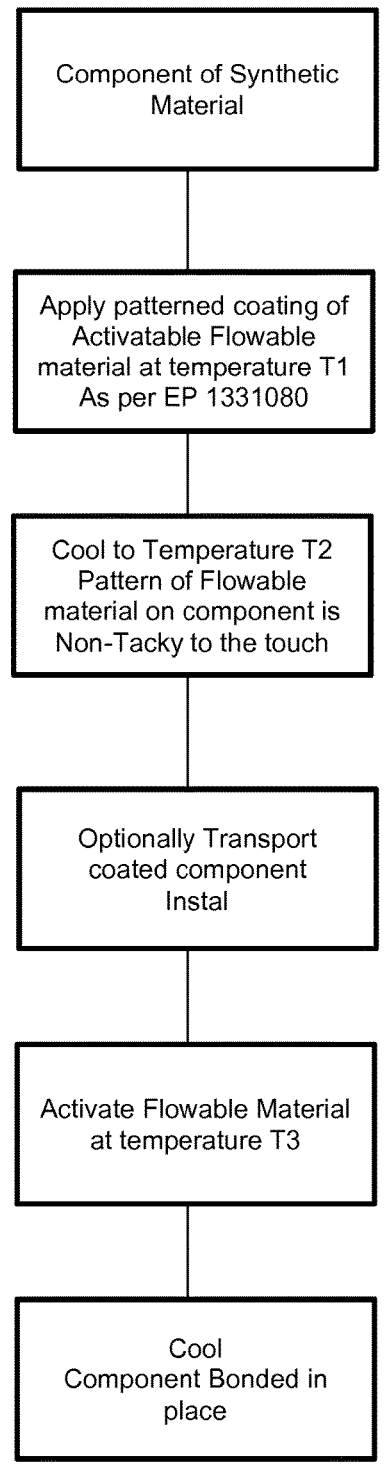
The material from which the component is made must withstand temperatures T1, T2 and T3. T3 must be greater than T1.

APPLYING FLOWABLE MATERIALS TO SYNTHETIC SUBSTRATES

The present invention generally relates to the application of post activatable flowable materials to substrates. In particular the invention relates to application of flowable materials that are activated after application. More particularly, the present invention relates to applying melt flowable materials such as heat activatable materials, such as sealants, expandable materials, weldable materials, structural materials, paintable materials or the like to components made from synthetic materials. The invention is particularly useful to produce articles employed in the transportation industry such as the automotive, aerospace and railroad industries, the furniture and construction industries. The automotive industry including automobiles, trucks, busses and tractors. It is particularly concerned with the production of components for automotive vehicles. The invention involves the selection of the materials to use as the flowable material and as the substrate.

Sealants, adhesives and other flowable or moldable materials are used in various components of a variety of articles of manufacture. Such flowable materials, for example, are used in metal automotive vehicle components for purposes such as increasing the structural integrity of the vehicle, sealing, attaching components (bonding) of the vehicle together, or improving vehicle noise, vibration or harshness (NVH) characteristics. Frequently it is desirable to apply the flowable material onto a substrate in a particular pattern and it may be required to produce a sequence of many similar articles.

The present invention is concerned with selection of materials suitable for the application of activatable flowable materials to component substrates produced from synthetic resins such as thermoplastic or thermosetting materials which can act as a carrier for the flowable material and to a process for the application and activation of the activatable flowable material.

The invention involves applying materials that are flowable when heated onto synthetic substrates which will be part of components of articles of manufacture. In particular preferred embodiments, the invention involves precisely extruding a highly viscous heat activatable flowable material onto one or more predetermined locations of one or more surfaces of synthetic substrates to produce components of an automotive vehicle. The flowable material is extruded at a temperature below that at which it can be activated and then cools to provide a solid preferably dry to the touch material on the substrate ready for subsequent heat activation.

The activatable flowable materials may be adhesive materials, sealant materials, expandable materials, structural materials, weldable materials, weld-through materials, paintable materials or other suitable flowable materials. In one highly preferred embodiment, the flowable materials may be treated or otherwise processed for the application of additional materials which facilitate and allow the formation of a class A painted surface finish, or other class of painted or treated surface, upon the flowable material. In other embodiments, the flowable materials may be electrically conductive, insulative, magnetic, transparent or posses another advantageous property along some or all of its length.

The activatable flowable materials are usually applied in a first physical state (e.g., molten but unactivated unfoamed, in the case of foamable materials, having a particular sectional profile, uncured, or otherwise) and are thereafter activated by exposure to a stimulus such as heat, a chemical or another suitable stimulus to induce or activate the flowable materials to transform (reversibly or irreversibly) to a second physical state (e.g., foamed, to a different sectional profile, cured or otherwise). It is preferred that the flowable material is applied to the substrate in a particular pattern determined by the use to which the component is to be put. It is further preferred that the flowable materials be applied to a series of substrates that are delivered sequentially to a location where the desired pattern of flowable material can be deposited thereon. It is further preferred that the process employing a series of substrates be robotic and employing the techniques described in European Patent 1331080 and PCT Publication No. WO 2012/104071.

The choice of the nature of the flowable materials will depend on the final properties it is to impart. For example it may impart desirable properties such as sound absorption, vibration absorption, corrosion resistance, adhesivity, sealing properties, strength, stiffness and the like which may enhance respective properties of components with which the materials is used. In a preferred embodiment it is a heat activated structural adhesive such as described in PCT Publication No. WO 2012/110230.

The flowable material may be applied from an applicator for reproducibly dispensing the flowable materials onto a surface of the substrate so that successive coated components can be produced automatically as in a production line. In one preferred embodiment, the material is dispensed from an extruder through a die. The apparatus may include mechanisms for moving substrates relative to an applicator (e.g., a die) of the apparatus, mechanisms for moving the applicator relative to the substrates or a combination thereof.

The present invention can therefore apply the flowable material directly onto a series of receiving component substrates to form components that can be further handled and incorporated in an assembly process. The flowable materials to be utilized in the present invention will be thermoplastic or thermosettable materials, typically encountered in manufacturing operations, such as the manufacturing of automotive, aerospace, marine and other vehicles as well as appliances, motor driven devices, and articles of furniture.

The substrates that receive flowable materials provide a surface suitable for receipt of the flowable material. The surfaces of the substrates may be treated (e.g., pretreated, post-treated or otherwise) to enhance adhesion of the flowable materials to its application surface.

The substrates that receive the flowable material are made of synthetic material which may be flexible or rigid according to the use to which the component is to be put. Examples of suitable materials are rigid materials such as epoxy resins, polyamides, polycarbonates, polyurethane, and polyolefine such as polypropylene or high density polyethylene. The substrate can include fillers and/or reinforcers such as glass fibre, carbon fibre, aramid, woven and non-woven mesh of glass, carbon fibre or organic material such as wood and flax. Alternatively the substrate may be of a flexible material such as a thermoplastic film of polyethylene terephthalate, polybutylene terephthalate, polyamide or polyolefines.

The nature of the flowable material and the nature of the material from which the substrate is produced will be selected to give the desired degree of adhesion between the substrate and the flowable material and the nature of the flowable material and the material of the substrate should be chosen so that the substrate can withstand the temperature at which the flowable material is applied to the surface of the substrate. Additionally the nature of the material from which the substrate is made should be such that it will withstand any conditions that are subsequently employed to activate the flowable material once it is located on the surface of the substrate such as by heating to cause the flowable material to foam for example during the baking process used in automotive anticorrosion and paint bake ovens. The material from which the substrate is made should be able to withstand subsequent processing conditions. The flowable material should preferably solidify to be dry to the touch after application to the substrate to allow the component comprising the coated substrate to be transported and to reduce pick up of dirt. The preferred temperature for application of the flowable material is in the range 60 to 120° C., preferably from 70 to 90° C. and the substrate should not therefore melt below 120° C. and if it melts it should do so above below the heat activation temperature of the activatable flowable material which according to the use is typically in the range 120° C. to 210° C.

The flowable materials used in the present invention can be chosen from a variety of different materials. The flowable materials may be heat activated after deposition on the substrate. They may be heat expandable materials or heat curable materials (to develop adhesive properties) or both heat expandable and heat curable. One preferred material is a material that may be activated to form an olefinic polymer-based foam, and more particularly an ethylene based polymer foam. Examples of particularly preferred polymers include ethylene vinyl acetate, copolymers, ethylene acrylate copolymers, EPDM, or mixtures thereof. Other examples of preferred foam formulation that are commercially available include polymer-based material commercially available from L&L Products, Europe, under the designations as L-2806, L-2801, L-2820, L-2822, L-7101, L-7102, L-7104, L-7105, L-7106, L-7107, L-7108, L-7109, L-7700, etc. and may comprise either open or closed cell polymeric base material. Such materials may exhibit properties including sound absorption, vibration absorption, sealing ability, corrosion resistance and the like.

The material may also be a heat-activated epoxy-based resin having foamable characteristics upon activation through the use of heat typically encountered in an e-coat or other automotive paint oven operation. As the expandable material is heated, it expands, cross-links, and structurally bonds to adjacent surfaces. An example of a preferred formulation is an epoxy-based material that may include polymer modificis such as an ethylene copolymer or terpolymer that is commercially available from L&L Products, Inc. of Romeo, Mich., under the designations that include L-5204, L-5207, L-5214, L-5234, L-5235, L-5236, L-5237, L-5244, L-5505, L-5510, L-5520, L-5540, L-5573 or combinations thereof. Such materials may exhibit properties including relatively high strength and stiffness, promote adhesion, rigidity, and impart other valuable physical and chemical characteristics and properties.

When acoustical damping properties are desired, it is contemplated that the present invention may utilize a foamable material formulated to assist in the reduction of vibration and noise after activation. In this regard, reinforced and vibrationally damped components can have increased stiffness which will reduce natural frequencies, that resonate through the automotive chassis thereby reducing transmission, blocking or absorbing noise through the use of the conjunctive acoustic product. By increasing the stiffness and rigidity of the components of a vehicle, the amplitude and frequency of the overall noise, vibration or both that occurs from the operation of the vehicle and is transmitted through the vehicle can be reduced.

In addition to the use of an acoustically damping material, the present invention could comprise the use of a combination of an acoustically damping material and a structurally reinforcing expandable material along different portions or zones of the member depending upon the requirements of the desired application. Use of acoustic expandable materials in conjunction with structural material may provide additional structural improvement but primarily would be incorporated to improve NVH characteristics.

A number of other suitable epoxy-based materials are known in the art and may also be used. One such foam preferably includes a polymeric base material, such as an ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally activated material, the foam is usually initially processed as a flowable thermoplastic material before curing. It will cross-link upon curing, which makes the material resistant of further flow or change of final shape.

In this regard, in applications where a heat activated, thermally expanding material is employed as the flowable material, a consideration involved with the selection and formulation of the material is the temperature at which a material reaction or expansion, and possibly curing, will take place. For instance, in most applications, it is undesirable for the material to be reactive at room temperature or otherwise at the ambient temperature in a production line environment since, in one embodiment, the material is extruded onto the synthetic substrate by a supplier and then shipped to the vehicle manufacturer as an integrated product. More typically, the material becomes reactive at higher processing temperatures, such as those encountered in an automobile assembly plant, when the material is processed along with the vehicle components at elevated temperatures or at higher applied energy levels, e.g., during e-coat preparation steps and other paint cycles. While temperatures encountered in an automobile e-coat operation may be in the range of about 120° C. to about 210° C. (about 250° F. to 400° F.), primer, filler and paint shop applications are commonly about 100° C. (about 200° F.) or higher. The material is thus operative throughout these ranges. If needed, blowing agent activators can be incorporated into the composition to cause expansion at different temperatures outside the above ranges. In such an embodiment the synthetic material from which the substrate is made should be selected to be able to withstand these temperatures to avoid thermal distortion of the component. In this instance a material having a melting point above 180° C. particularly in the range 180° C. to 350° C., preferably 180° C. to 260° C. is preferred.

Generally, suitable expandable flowable materials have a range of volumetric expansion from approximately 0 to over 2000%. The level of expansion of the vibration reduction material may be increased to as high as 1500% or more. In certain embodiments, the material may be hyper-expandable materials that expand more than 1500% and preferably over about 2000%.

For application purposes, it is often desirable for the activatable flowable materials used in the present invention to be formulated such that the materials exhibit desired properties (e.g., tackiness or non-tackiness) at various different processing stages or temperature. For example, if the material is heat activated the material is preferably solid and non-tacky to the touch at ambient temperature so that it can be stored as pellets and easily provided to an applicator such as a robotic extruder. The material should become flowable at a temperature below the activation temperature of the material to enable it to be applied to the substrate and it should have sufficient adhesive properties at the application temperature that it will adhere to the surface of the substrate. It should then solidify upon cooling to provide a non-tacky to the touch coating on the substrate. The material will then be activatable typically foamable and/or curable at temperatures above that at which it was applied to the substrate. The material from which the substrate is made should withstand all the activities within this cycle.

As discussed particularly for automotive operations, it is generally desirable for flowable materials of the present invention to activate at temperatures experienced during paint cycles. Prior to activation, however, it is often preferable for the flowable materials to be exhibit solid and substantially non-tacky characteristics at temperatures near room temperature (e.g., between about 5° C. and about 50° C.), while exhibiting characteristics of slight flow and tackiness without activation at mid-level temperatures (e.g., between about 50° C. and about 100° C.). Advantageously, these characteristics allow the materials to be stored, transported and maintained in pellet form without substantial adhesion between the pellets. At the same time, the materials can be heated to mid-level temperatures to allow the materials to adhere to the surface of the synthetic substrate.

It is also contemplated that the flowable materials may be formulated with one or more materials, which assist in adhering the materials to the synthetic substrate upon application thereto.

In one embodiment, the flowable material includes a two-component system wherein a first material interacts with a second material to increase tack of the flowable material during application. For example, pellets of a relatively lower molecular weight material may be combined with pellets of a compatible higher molecular weight base polymer, which, upon mixing and elevation to a mid-range temperature, increase tack due to the compatibility of the two types of pellets. As another example, a small amount of pellets of one material may be combined with pellets formed of a second material wherein the first material has reactive functionality that is activated upon mixing with the second material for promoting adhesion.

In the preferred embodiment in which the flowable material is applied by extrusion, it is important to help keep processing temperatures below the activation temperature of the material, particularly with heat expandable adhesives and sealants. A preferred apparatus for applying the flowable materials is partially or totally automatically controlled, although a combination of manual and automatic control is contemplated and in some circumstances may be desirable. Preferably, a control system sends computerized commands telling the applicator when and where to apply the flowable material to the substrates such that the material is properly applied to appropriate predetermined areas on the surfaces of the substrates. Such a system is described in European Patent 1331080 and PCT Publication No. WO 2012/104071.

It may be desirable to pretreat the surface of the substrate to increase the adhesive between the surface of the substrate and the flowable material. It may be abraided or plasma treated. Alternatively the surface may be heated for example by hot air flowing prior to applying flowable material to the surface. For example, some processes of the present invention include steps of heating the surfaces for cleaning (e.g., driving off a contaminant), for enhancing the adhesion. The surface may be heated by radiation, conduction, convection or combination thereof, using a heater such as an oven or furnace into which the components are inserted and removed, or are passed through, by a bath, by a light source (e.g., a laser, a lamp, or otherwise), a flame, an inductor or some other suitable heater. The heater may be provided as part of the apparatus for applying the flowable materials or separately, both of which are discussed below.

In a preferred embodiment, the flowable material is applied from an extruder which uses closed loop control on the rotation of the screw of the extruder. (i.e., the sensor tells the PLC how fast the extrudate is being emitted and the screw of the extruder may be rotated slower or faster to realize a proper rate). In this manner, control over the rate of emission of the extrudate can be precisely controlled and the extruder can get to the desired speed of emission in a very short period of time (e.g., less than a second). It is preferred that it is applied at a temperature in the range 60° C. to 120° C., more preferably 80° C. to 120° C.

In a highly preferred embodiment, the applicator uses closed loop control based upon a metering system. In such a system, the output of flowable material from the extruder is experimentally related to the positioning angle of the extruder and the rotational speed of the extruder screw. With reasonable amounts of experimentation the amounts of volumetric flowable material output for different rotational speeds of the extruder screw can be determined to a reasonably high degree of certainty thereby permitting proper volumetric output of flowable material as long as the rotational speed of the extruder screw is commesurate with such output.

For certain embodiments of the present invention, it may be desirable for the activatable flowable material to be applied to a substrate to produce a component at one location, followed by transporting the component to a second location for assembly to an article of manufacture. For example, in the automotive industry, an automotive component supplier may desire to apply a flowable material to a substrate at its own facility that is geographically remote from an assembly plant (e.g., an original equipment automotive vehicle assembly line). Thereafter, the component is typically shipped or otherwise transported to an automotive assembly plant where it is assembled to a vehicle usually prior to painting of the vehicle.

In many instances it is desirable to deposit the flowable material on the substrate in a particular pattern. This may be accomplished by moving the substrates relative to an applicator such that the melt flowable materials emitted from the applicator are properly positioned on the surfaces of the substrates. As examples, the substrate may be placed or mounted upon a surface or other supports and movement systems such as conveyor belts, robots, robot arms, carousels, turntables and the like are provided for moving the substrates beneath an applicator. These systems may move the substrates radially about an axis, along a contoured path, along one or more lines or otherwise. Moreover, these systems may move independently or dependently relative to a robot arm, which may move the applicator and these systems may have a same or different controller from the robot arm. The substrates may be moved relative to the flowable materials either faster, slower or at substantially the same rate that the flowable materials are emitted from an applicator. The flowable materials may be applied to the substrates along almost any predetermined path. Alternatively the applicator may be moved relative to the surface of the substrate and it is a sequential operation a first substrate may be placed on a support and a pattern of material deposited thereon by movement of the applicator. Once the pattern is deposited the first substrate may be removed and replaced by a second substrate and the cycle may be repeated continuously until the desired number of coated substrates have been produced.

The flowable materials may be applied to the substrates in a variety of shapes. As an example, the flowable materials are applied as beads through a die and assume the shape of an opening of the die. By using different dies, different shapes may be created. Moreover flowable materials may be applied as a single continuous bead or as a plurality of spaced beads. The beads also may vary in size as desired. For example, cross-sectional areas of the beads may range from about 1 mm² up to about 100 mm² and more preferably from about 10 mm² to about 50 mm² and still more preferably from about 10 mm² to about 30 mm².

According to one embodiment, it may be desirable for the flowable materials to maintain certain chemical or physical properties, referred to herein as pre-assembly properties, for relatively large intervals of time between application of the flowable materials to a substrate and assembly of the substrate to an article of manufacture. After assembly, however, it may be desirable for the flowable materials to exhibit other physical properties referred to herein as post-assembly properties. Flowable materials are provided according to the present invention wherein the materials applied to the substrates exhibit properties such as non-tackiness and the like, shortly after they are initially applied to the substrates. In this manner the flowable materials may be applied to the substrates in a condition suitable for transport (i.e., the substrates can be placed adjacent or in contact with each other or other substrates without the flowable materials adhering or otherwise attaching to adjacent substrates). Thereafter, the flowable materials can be triggered by heat, chemicals or other stimulus to change the chemical or physical properties of the flowable materials during or after the time that the substrates upon which the flowable materials reside are assembled within an article of manufacture. The chemical or physical properties after triggering may include adhesivity, expansion and the like.

It is contemplated that the flowable material is applied in a visco-elastic state which can easily and uniformly be applied to an exterior surface of the substrates in a relatively clean manner where it initially bonds to the substrate and then hardens. Once the material is applied to a substrate in a desired shape and pattern, the material cools at the ambient temperature found in a manufacturing facility which allows the material to return to its original solid or dry chemical state thereby adhering to the external surface of the substrate to provide a component that is dry and non-tacky to the touch. The component may then be integrated into an article of manufacture such as an automotive vehicle for activation of the flowable material such as by the application of heat such as from the e-coat process as well as other paint operation cycles commonly found in an automotive manufacturing facility. The material is allowed to expand, and may also cure thereby chemically cross-linking the material to bond with the external surfaces of other adjacent components of the article of manufacture.

According to one highly preferred embodiment, the flowable material is a plastic adhesive that is non-tacky below a first temperature of, for example, around 40° C. but exhibits tackiness when heated above the first temperature and exhibits an even higher degree of tackiness at a second higher temperature, which is around those temperature exhibited by a typical e-coat process as discussed above. Thus, the plastic adhesive can be applied to the substrates at temperatures between 40° C. and 180° C., preferably 60° C. to 120° C. and the adhesive will adhere to the substrates adequately. Preferably, the flowable material is still substantially in its green or non-activated/non-cured state. Thereafter, the adhesive may be cooled or partially cured to temperatures below around 40° C. such that the component may be transported without the adhesive adhering to other objects, which it may come into contact with. Then, the component may be assembled within an article of manufacture and the temperature may be elevated to the second temperature so that the adhesive of component is activated so that the component is adhesively secured as a component of the article of manufacture once the adhesive is again cooled or finally cured. Such an adhesive provides an advantage over other adhesives since it does not typically sag, run, wash away or get displaced during processing and handling. In one embodiment the adhesive may also be foamable and preferably at or around the temperature that the adhesive properties are activated so that it will expand outwardly from the surface of the component and bond to another component of an automobile such as a panel or the interior surface of a hollow structural member such as a rail or a pillar.

The material for the substrates should be selected so that it is not damaged by the application or activation of the flowable material. So if the flowable material is heated for application to the substrate the material of the substrates should be able to withstand the temperatures at which the flowable material is applied. Furthermore if the flowable material is to be subsequently heat activated the material of the substrates should be able to withstand the heat activation conditions.

The invention is particularly useful for the production of automobile parts comprising the substrates and the flowable material such as structural reinforcing components comprising a carrier of a synthetic material and a structural foam. Alternatively it may provide sealants and acoustic barriers comprising a carrier of a synthetic material and a soft foam. The components may be used to insulate and/or reinforce automotive door beams, pillars, roof bars, cross beams, flooring and tunnels. Additionally it may provide heat activated adhesives carried on a synthetic support such as a tape for bonding together substrates in vehicles.

A preferred embodiment of the invention is illustrated by the flow chart that is FIG. 1 hereto.

The invention claimed is:

1. A process for applying materials that are flowable when heated onto synthetic substrates comprising:
precisely applying a heat activatable flowable material onto one or more predetermined locations of one or more surfaces of one or more synthetic substrates, wherein the flowable material is extruded at a temperature where the flowable material bonds to the surface of the substrate and at a temperature below that at which the flowable material is activated and then cools to provide a solid, dry to a touch material on the one or more substrates ready for subsequent heat activation; wherein the one or more synthetic substrates melt at a temperature above a heat activation temperature of the activatable flowable material; wherein one or more of the synthetic substrates that receive the flowable material are of a flexible material; wherein the flexible material is a film of polyethylene terephthalate, polybutylene terephthalate, polyamide or polyolefins; and wherein the one or more synthetic substrates are free of thermal distortion during activation of the flowable material.

2. The process according to claim 1, wherein the activatable flowable material is selected from adhesive materials, sealant materials, expandable materials, structural materials, weldable materials, weld-through materials, and paintable materials.

3. The process according claim 2, wherein one or more of the synthetic unit substrates that receive the flowable material are reinforced with glass, aramid, or carbon fibers.

4. The process according to claim 1, wherein the activatable flowable material is applied in a first physical state and is thereafter activated by exposure to heat or a chemical reaction to cause the flowable material to transform to a second physical state.

5. The process according to claim 1, wherein the flowable material is applied to one or more of the substrates in a pattern.

6. The process according to claim 1, wherein the flowable material is applied to a series of substrates that are delivered sequentially to a location where the desired pattern of flowable material is deposited on each of the series of substrates.

7. The process according to claim 6, wherein the flowable material is applied directly onto a series of receiving component substrates to form components that are further handled and incorporated in an assembly process.

8. The process according to claim 1, wherein the flowable material is applied at a temperature in the range of about 60 to about 120° C.

9. The process according to claim 8, wherein one or more of the substrates do not melt below 120° C.

10. The process according to claim 1, wherein the flowable material is heat activated after deposition on the substrate.

11. The process according to claim 10, wherein the heat activation comprises heat expansion, heat curing, or both.

12. The process according to claim 1, wherein the flowable material is activated at temperatures encountered during an e-coat operation.

13. The process according to claim 12, wherein the synthetic material from which one or more of the substrates are made is selected to be able to withstand the temperatures encountered in the e-coat operation.

14. The process according to claim 12, wherein the temperatures are in the range of about 220° C. to about 350° C.

15. The process according to claim 1, wherein the flowable material prior to activation is solid and substantially non-tacky to a touch at temperatures near room temperature between about 5° C. and about 50° C. and exhibits characteristics of adherence to the one or more synthetic substrates and tackiness without activation at temperatures between about 50° C. and about 100° C.

16. The process according to claim 1, wherein the flowable material is applied from an extruder that uses closed loop control on rotation of a screw of the extruder and it is applied at a temperature in a range of about 60° C. to about 120° C.

17. The process according to claim 16, wherein the substrates are moved relative to an applicator.

18. The process according to claim 1, wherein one or more of the synthetic substrates that receive the flowable material are reinforced with glass, aramid, or carbon fibers.

19. The process according to claim 1, wherein one or more surfaces of the one or more synthetic substrates are heated prior to applying the flowable material for enhancing adhesion.

* * * * *

UNITED STATES PATENT AND TRADEMARK OFFICE
CERTIFICATE OF CORRECTION

PATENT NO. : 9,987,785 B2
APPLICATION NO. : 14/396768
DATED : June 5, 2018
INVENTOR(S) : Francois Crouzet Page 1 of 1

It is certified that error appears in the above-identified patent and that said Letters Patent is hereby corrected as shown below:

On the Title Page

OTHER PUBLICATIONS
Delete "European Communication dated May 12, 2013, Application No. 13726879.3"
Insert --European Communication dated May 12, 2015, Application No. 13726879.3--

Signed and Sealed this
Fourth Day of September, 2018

Andrei Iancu
*Director of the United States Patent and Trademark Office*